(12) United States Patent
Blum et al.

(10) Patent No.: US 7,155,255 B2
(45) Date of Patent: Dec. 26, 2006

(54) COMMUNICATION EQUIPMENT, TRANSCODER DEVICE AND METHOD FOR PROCESSING FRAMES ASSOCIATED WITH A PLURALITY OF WIRELESS PROTOCOLS

(75) Inventors: Philip C. Blum, Chicago, IL (US); Michael W. Bychowsky, Crystal Lake, IL (US); Esteban Yepez, III, Albuquerque, NM (US)

(73) Assignee: Motorola, Inc., Schaumburg, IL (US)

( * ) Notice: Subject to any disclaimer, the term of this patent is extended or adjusted under 35 U.S.C. 154(b) by 1170 days.

(21) Appl. No.: 10/053,338

(22) Filed: Oct. 25, 2001

(65) Prior Publication Data

US 2003/0083102 A1    May 1, 2003

(51) Int. Cl.
*H04B 1/38* (2006.01)
(52) U.S. Cl. ............. 455/560; 455/426.1; 455/432.3; 455/517; 370/466
(58) Field of Classification Search ............. 455/456, 455/426.1, 432.2, 432.3, 557, 517, 524, 560, 455/422.1, 552.1; 370/467, 401, 466
See application file for complete search history.

(56) References Cited

U.S. PATENT DOCUMENTS

| 6,014,375 A | 1/2000 | Janky |
| 6,542,486 B1 * | 4/2003 | Lewis et al. ............. 370/335 |

FOREIGN PATENT DOCUMENTS

| EP | 0 909 081 A2 | 4/1999 |
| EP | 1 014 737 A2 | 6/2000 |

* cited by examiner

*Primary Examiner*—Melur Ramakrishnaiah
(74) *Attorney, Agent, or Firm*—Jeffrey K. Jacobs

(57) ABSTRACT

To address the need for an apparatus and method for transcoding among multiple wireless protocols, the present invention provides a framework for more generalized transcoding. A voice processing resource (e.g., 105) of a transcoder (101) receives the dynamic transcoding attributes (e.g., 201–207) for a frame and then transcodes that frame according to the requirements of the transcoding attributes. These dynamic attributes may contain information such as the wireless protocol involved, the frame type, the source type, the sequence number, the delivery timing requirements, and the delivery mode of subsequent frames.

17 Claims, 2 Drawing Sheets

COMMUNICATION EQUIPMENT, TRANSCODER DEVICE AND METHOD FOR PROCESSING FRAMES ASSOCIATED WITH A PLURALITY OF WIRELESS PROTOCOLS

FIELD OF THE INVENTION

The present invention relates generally to communications systems and, in particular, to transcoding a plurality of wireless protocols.

BACKGROUND OF THE INVENTION

Transcoders are an essential part of today's wireless digital communications systems. They are used to convert (or transcode) between pulse code modulation (PCM) and the various voice-coding (or vocoding) protocols that are used to transport voice information over-the-air. Transcoders today, such as Motorola's "iDEN" transcoder, are built and optimized for transcoding the particular air interface of a target communication system. For example, Motorola's "iDEN" transcoder is optimized for transcoding the "iDEN" air interface in an "iDEN" communication system. However, the marketplace is now demanding more complete and integrated communications solutions, such as systems that integrate multiple air interface protocols. Transcoding optimized for a particular protocol, therefore, is less desirable. Thus, an apparatus and method for transcoding among multiple wireless protocols is needed.

DESCRIPTION OF A PREFERRED EMBODIMENT

To address the need for an apparatus and method for transcoding among multiple wireless protocols, the present invention provides a framework for more generalized transcoding. A voice processing resource of a transcoder receives the dynamic transcoding attributes for a frame and then transcodes that frame according to the requirements of the transcoding attributes. These dynamic attributes may contain information such as the wireless protocol involved, the frame type, the source type, the sequence number, the delivery timing requirements, and the delivery mode of subsequent frames.

Figure 1:
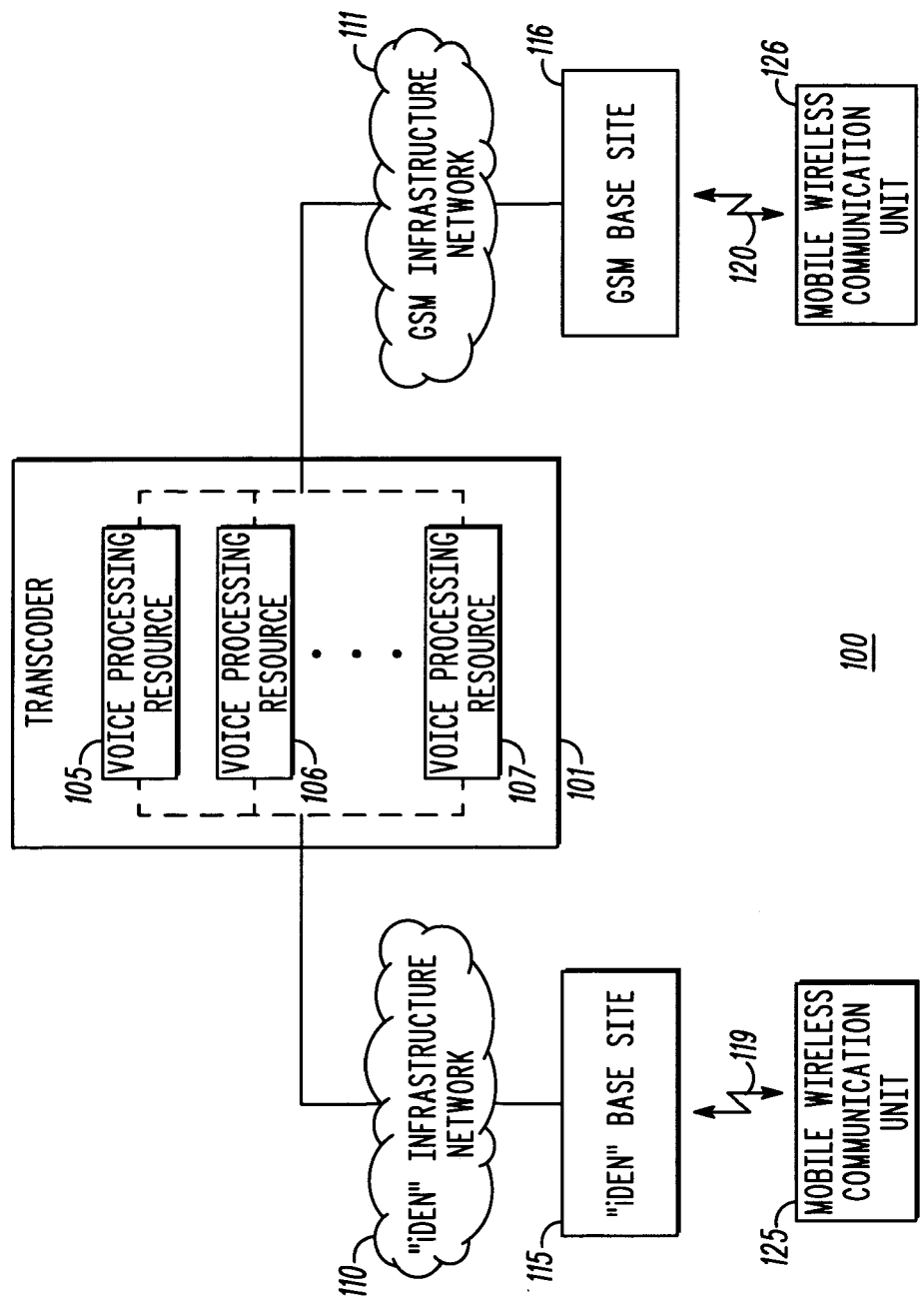
FIG. 1 is a block diagram depiction of a communication system in accordance with a preferred embodiment of the present invention.
Figure 2:
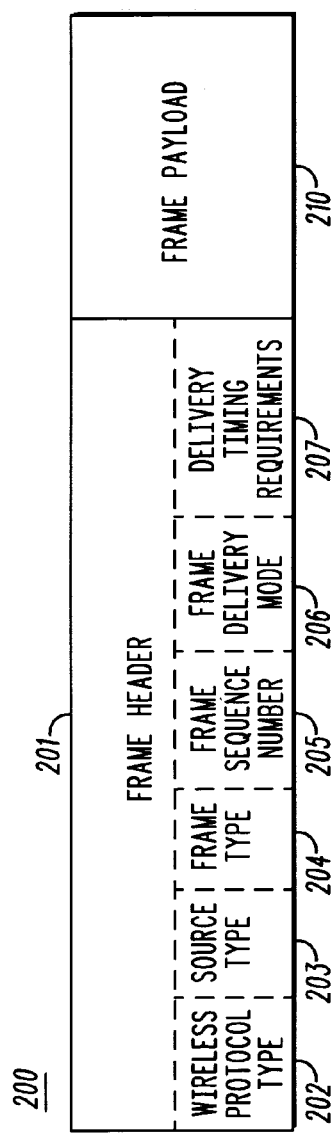
FIG. 2 is a block diagram depiction of a transcoder frame in accordance with a preferred embodiment of the present invention.
Figure 3:
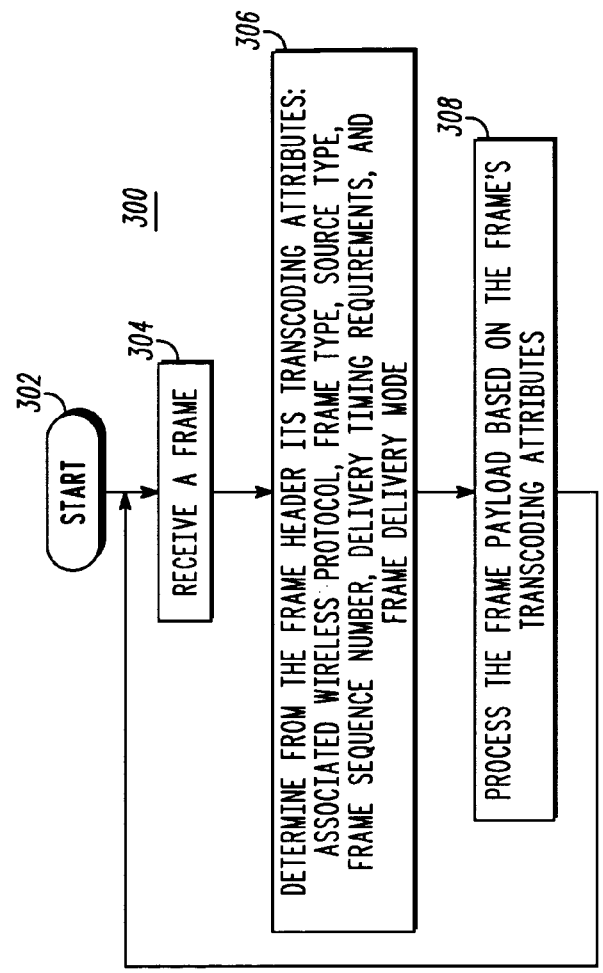
FIG. 3 is a logic flow diagram of steps executed by a transcoder in accordance with a preferred embodiment of the present invention.

The present invention can be more fully understood with reference to FIGS. 1–3. FIG. 1 is a block diagram depiction of communication system 100 in accordance with a preferred embodiment of the present invention. Preferably, communication system 100 comprises a known "iDEN" subsystem and a known GSM subsystem, each modified as described below to implement the present invention and otherwise integrated to provide system-wide communication services across both wireless standards. Although an "iDEN" and a GSM subsystem are shown in FIG. 1, they are merely shown as an example of systems that may be integrated. The scope of the present invention is not limited to the particular types or number of differing systems that are integrated. For example, the present invention would be equally applicable to an integrated system that included an "iDEN" subsystem, a TETRA subsystem, a GSM subsystem, and a "HARMONY" subsystem. (Note, "iDEN", TETRA, GSM, and "HARMONY" wireless communication equipment is available from Motorola, Inc. of Schaumburg, Ill.)

System 100 comprises fixed network equipment and mobile communication units. The fixed network equipment, or communication infrastructure, includes transcoder 101 and base sites 115 and 116 that are preferably networked to other base sites, controllers, transcoders, and switches, all part of infrastructure networks 110 and 111 and all well known to those skilled in the art. For simplicity, only transcoder 101 and base sites 115 and 116 are shown in FIG. 1.

Again for simplicity, only two of what could be thousands of mobile communication units are shown in FIG. 1. Communication units 125 and 126 each preferably comprise wireless phones that transmit and receive communications from base sites 115 and 116, respectively, via "iDEN" wireless protocol 119 and GSM wireless protocol 120, respectively. Each of the communication units 125 and 126 preferably comprises a common set of elements, a transmitter, a receiver, and a processor that comprises one or more memory devices and processing devices (e.g., microprocessors, digital signal processors, etc.). Each of these elements is well known in the art, as are communication units in general.

Transcoder 101 preferably comprises numerous voice processing resources, e.g., voice processing resources 105–107. Each voice processing resource comprises one or more memory devices and processing devices (e.g., microprocessors, digital signal processors, etc.) In the preferred embodiment, under the control of software/firmware algorithms stored in the memory devices of transcoder 101, transcoder 101 performs those tasks required for well-known transcoder operation and, additionally, the method described relative to FIG. 3.

Operation of preferred communication system 100, in accordance with the present invention, occurs substantially as follows. Assume that the user of communication unit 125 initiates a call to the user of unit 126. Because unit 125 communicates with base site 115 via "iDEN" wireless protocol 119 and unit 126 communicates with base site 116 via GSM wireless protocol 120, transcoder 101 must transcode "iDEN" vocoded voice frames into GSM vocoded voice frames for transmission to unit 126 via base site 116. Preferably, transcoder 101 allocates voice processing resources, such as resources 105 and 106, to handle the transcoding for the call, resource 105 to transcode voice encoded per the "iDEN" wireless protocol into voice encoded per the GSM wireless protocol and resource 106 to transcode GSM voice to "iDEN" voice.

Base site 115 receives wireless information for the call from unit 125 via "iDEN" wireless protocol 119. Base site 115 then generates a frame associated with the "iDEN" wireless protocol that contains at least a portion of the wireless information and sends the frame to voice processing resource 105. To better understand the frame that is generated by base site 115, FIG. 2 will be now be discussed before returning to the discussion of system 100's operation.

FIG. 2 is a block diagram depiction of such a preferred transcoder frame. Frame 200 contains frame header 201 and frame payload 210. Payload 210 comprises encoded voice information from unit 125, while header 201 contains an indication of the frame's associated wireless protocol (wireless protocol type 202), the frame's source type (source type 203), the frame's type (frame type 204), the frame's sequence number (frame sequence number 205), the delivery mode for future frames (frame delivery mode 206), and the frame's delivery timing requirements (delivery timing requirements 207).

Although preferred frame 200 contains wireless protocol type 202, an alternative frame may instead contain a system type and a call type from which the wireless protocol associated with the frame can be determined. System types may include "iDEN", TETRA, GSM, CDMA, "DIMETRA", and "HARMONY", while call types may include interconnect and dispatch. A transcoder in a system that supported "iDEN" calls could determine, for example, from an alternative frame that specified "iDEN" as the system type whether "iDEN" 3:1 or New 6:1 voice encoding was the associated wireless protocol based on whether the call type indicated interconnect or dispatch, respectively.

Source type 203 preferably indicates whether the source of the frame is an asynchronous base site, a subscriber (i.e., a mobile wireless communication unit, an asynchronous transcoder, or a synchronous transcoder. Frame type 204 preferably indicates the type of each packet in payload 210. In addition to audio or encoded voice packets, payload 210 may also contain control packets, error correction packets, debug packets, diagnostic packets, TTY-Baudo packets, key size packets, key type packets, loading packets, timing packets, sequencing/ordering packets, or priority packets. Alternatively, instead of indicating the type of each packet in payload 210, frame type 204 may simply indicate the number of packets in payload 210. Delivery mode 206 preferably indicates information such as a frame delivery frequency, a frame delivery rate, an interval between frame deliveries, or a pattern of frame deliveries for subsequent frames. Frame sequence number 205 and delivery timing requirements 207 allow the reconstruction of the timing produced by the source (so that audio can be contiguously played). Additionally, sequence number 205 can be used to estimate a packet loss rate. Lastly, delivery timing requirements 207 preferably indicates a timestamp derived from a clock that increments monotonically and linearly in time to allow for synchronization and jitter calculations. The particular clock frequency and resolution may depend on the particular protocol, source and frame types.

Having discussed in detail the frame generated by base site 115, the discussion of system 100's operation with reference to FIG. 1 will now be resumed. Voice processing resource 105 preferably receives the frame with its embedded indications of the associated wireless protocol, the source type, the frame type, the frame sequence number, the frame delivery mode, and the delivery timing requirements. Resource 105 then processes the payload portion of the frame based on the header information. For example, voice processing resource 105 preferably configures itself to transcode the frame payload according to the wireless protocol indicated. This processing substantially amounts to selecting the appropriate software and establishing the input parameters for the software.

Prior art transcoders do not determine what wireless protocol to transcode based on frame header information but rather are preconfigured to transcode a single wireless protocol. Likewise, for the other header information, prior art transcoders do not reconfigure their transcoding based on the header information in their received frames, but again are dedicated or pre-configured for the transcoding tasks that their systems require.

Thus, in the preferred embodiment of the present invention the dynamic information required for transcoding in today's communication systems is sent within each transcoder frame. This allows the transcoding function to be modified on a call-by-call or even frame-by-frame basis. Furthermore, this generalization of the transcoding function allows for simplified integration, at least in the transcoding realm, of systems that use different wireless protocols.

This generalized transcoding is illustrated in the preferred embodiment by the scenario where the first call ends and another call, this time from GSM unit 126, begins. Voice processing resource 105 may be reallocated to the new call and, in which case, may begin receiving transcoder frames associated with the GSM protocol. Thus, resource 105 which previously transcoded "iDEN" frames now transcodes GSM frames generated by base site 116 in accordance with the transcoding parameters specified in each of the frames. If system 100 had a TETRA subsystem in addition to the "iDEN" and GSM subsystems, voice processing resource 105 could later receive frames associated with the TETRA protocol. Resource 105 would then transcode the TETRA frames according to the dynamic header information in each frame. Therefore, the present invention provides "multi-protocol" transcoding using the same transcoder equipment.

FIG. 3 is a logic flow diagram of steps executed by a transcoder in accordance with a preferred embodiment of the present invention. Logic flow 300 begins (302) when the transcoder receives (304) a transcoder frame. As discussed previously, the transcoder then determines (306) from the frame header the transcoding attributes that apply to this frame and processes (i.e., transcodes) (308) the payload of the frame according to the attributes determined. The transcoder preferably repeats these steps for subsequently received frames.

While the present invention has been particularly shown and described with reference to particular embodiments thereof, it will be understood by those skilled in the art that various changes in form and details may be made therein without departing from the spirit and scope of the present invention. For example, although the dynamic transcoding attributes are preferably received by the voice processing resources in the frame headers, the present invention is not limited to this implementation. Some or all of the attributes may be received as part of other control information, not considered frame header information.

What is claimed is:

1. A method for a voice processing resource to process frames associated with a plurality of wireless protocols, the method comprising the steps of:

receiving, by the voice processing resource from a base site, a first frame associated with a first wireless protocol;

receiving, by the voice processing resource from a base site, a frame type of the first frame;

receiving, by the voice processing resource from a base site, delivery timing requirements of the first frame;

receiving, by the voice processing resource from a base site, a source type of the first frame; and processing, by the voice processing resource, the first frame based on the first wireless protocol, the frame type, the delivery timing requirements, and the source type, wherein the first frame comprises a frame header and a frame payload, wherein the frame header of the first frame comprises a wireless protocol type of the first frame, the frame type of the first frame, the delivery timing requirements of the first frame, and the source type of the first frame.

2. The method of claim 1 further comprising the steps of:
receiving, by the voice processing resource from a base site, a second frame associated with a second wireless protocol, wherein the second wireless protocol is different than the first wireless protocol;
receiving, by the voice processing resource from a base site, a frame type of the second frame;
receiving, by the voice processing resource from a base site, delivery timing requirements of the second frame;
receiving, by the voice processing resource from a base site, a source type of the second frame; and
processing, by the voice processing resource, the second frame based on the second wireless protocol, the frame type of the second frame, the delivery timing requirements of the second frame, and the source type of the second frame.

3. The method of claim 2 wherein the first frame comprises a frame header and a frame payload, wherein the frame header of the first frame comprises a wireless protocol type of the first frame, the frame type of the first frame, delivery timing requirements of the first frame, and the source type of the first frame, wherein the second frame comprises a frame header and a frame payload, wherein the frame header of the second frame comprises a wireless protocol type of the second frame, the frame type of the second frame, the delivery timing requirements of the second frame, and the source type of the second frame.

4. The method of claim 1 further comprising the step of determining from the frame header of the first frame an indication of ordering for the first frame, wherein the step of processing the first frame comprises the step of processing the frame payload of the first frame based on the indication of ordering for the first frame.

5. The method of claim 4 wherein the indication of ordering for the first frame comprises a sequence number.

6. The method of claim 1 further comprising the step of determining from the frame header of the first frame a frame delivery mode for future frames, wherein the step of processing the first frame comprises the step of processing the frame payload of the first frame based on the frame delivery mode for future frames.

7. The method of claim 6 wherein the frame delivery mode for future frames comprises information selected from the group consisting of a frame delivery frequency, a frame delivery rate, an interval between frame deliveries, and a pattern of frame deliveries.

8. The method of claim 1 wherein the frame type comprises a number of packets in the payload of the first frame.

9. The method of claim 1 wherein the frame type comprises a type of each packet in the payload of the first frame.

10. The method of claim 9 wherein a type of a packet in the payload of the first frame comprises a type of a packet selected from the group consisting of audio, control, error correction, debug, diagnostic, TTY-Baudo, key size, key type, loading, timing, sequencing/ordering, and priority.

11. The method of claim 1 wherein the source type of the first frame comprises a source type selected from the group consisting of an asynchronous base site, a subscriber, an asynchronous transcoder, and a synchronous transcoder.

12. The method of claim 1 wherein the frame header of the first frame further comprises a system type and a call type from which a wireless protocol associated with the first frame is determined.

13. The method of claim 12 wherein the system type of the first frame comprises a system type selected from the group consisting of "iDEN", TETRA, GSM, CDMA, "DIMETRA", and "HARMONY".

14. A transcoder device comprising:
at least one voice processing resource capable of receiving a first frame associated with a first wireless protocol, a frame type of the first frame, delivery timing requirements of the first frame, and a source type of the first frame and capable of processing the first frame based on the first wireless protocol, the frame type, the delivery timing requirements, and the source type, wherein the first frame comprises a frame header and a frame payload, wherein the frame header of the first frame comprises a wireless protocol type of the first frame, the frame type of the first frame, the delivery timing requirements of the first frame, and the source type of the first frame.

15. The transcoder device of claim 14 wherein the at least one voice processing resource capable of receiving the first frame associated with the first wireless protocol is further capable of receiving a second frame associated with a second wireless protocol that is different than the first wireless protocol, a frame type of the second frame, delivery timing requirements of the second frame, and a source type of the second frame and further capable of processing the second frame based on the second wireless protocol, the frame type of the second frame, the delivery timing requirements of the second frame, and the source type of the second frame.

16. Communication equipment comprising:
a first base site capable of receiving wireless information via a first wireless protocol, capable of generating a first frame associated with the first wireless protocol containing at least a portion of the wireless information, and capable of sending to a voice processing resource the first frame, a frame type of the first frame, delivery timing requirements of the first frame, and a source type of the first frame, wherein the first frame comprises a frame header and a frame payload, wherein the frame header of the first frame comprises a wireless protocol type of the first frame, the frame type of the first frame, the delivery timing requirements of the first frame, and the source type of the first frame.

17. The communication equipment of claim 16 further comprising:
a second base site capable of receiving wireless information via a second wireless protocol that is different than the first wireless protocol, capable of generating a second frame associated with the second wireless protocol containing at least a portion of the wireless information, and capable of sending to the voice processing resource the second frame, a frame type of the second frame, delivery timing requirements of the second frame, and a source type of the second frame.

* * * * *